F. S. INGOLDSBY.
DUMP CAR.
APPLICATION FILED SEPT. 20, 1906. RENEWED OCT. 17, 1910.

1,028,882.

Patented June 11, 1912.
5 SHEETS—SHEET 3.

Witnesses
J. H. Martinsooke
A. L. Lord.

Inventor
Frank S. Ingoldsby
by Bates, Fouts & Hull
Attorneys.

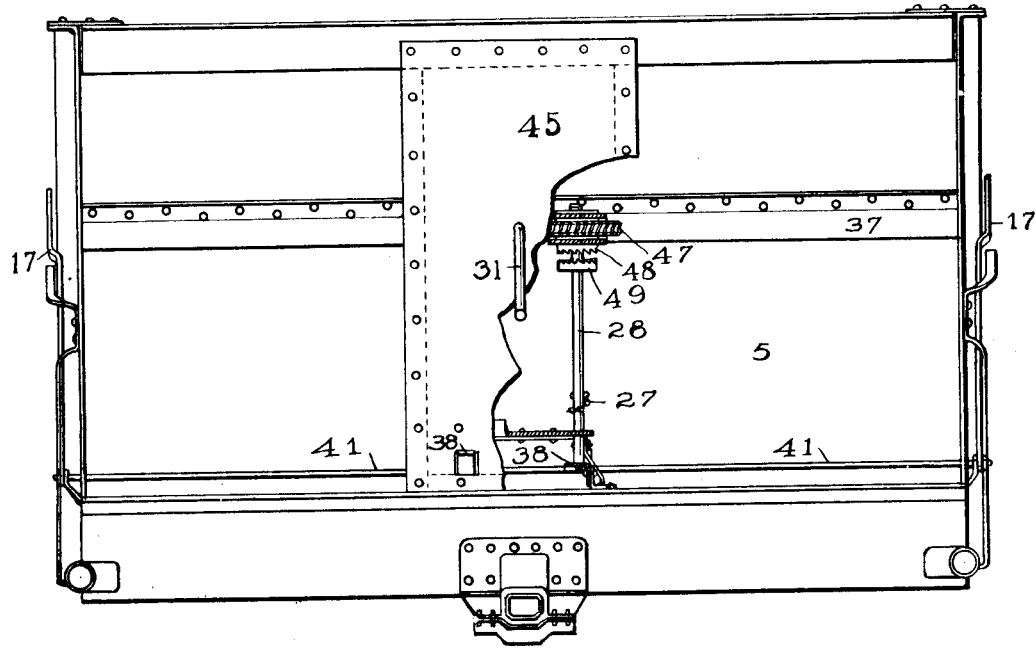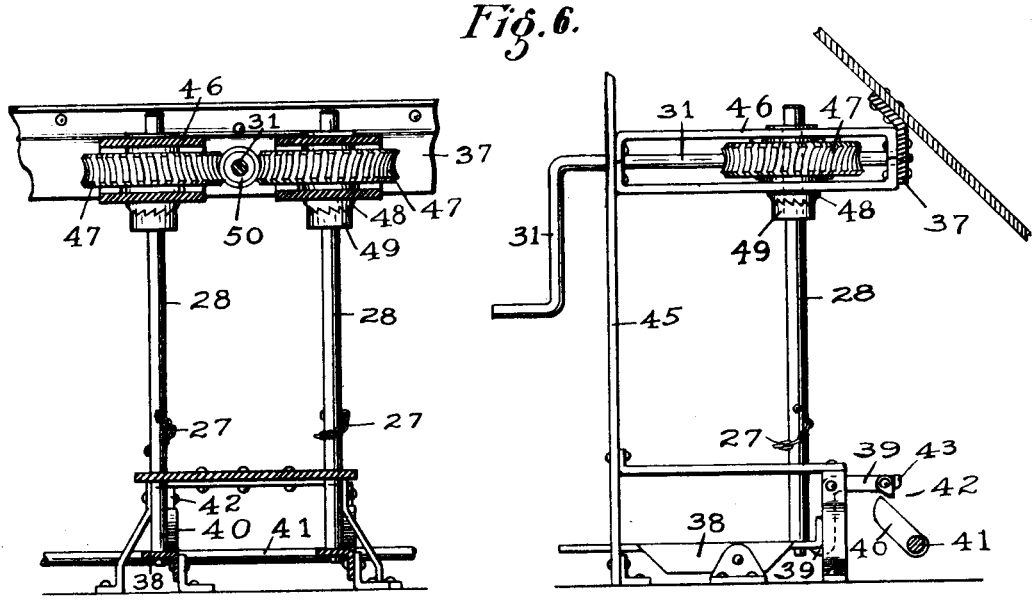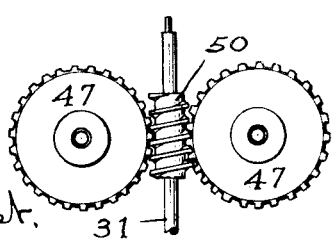

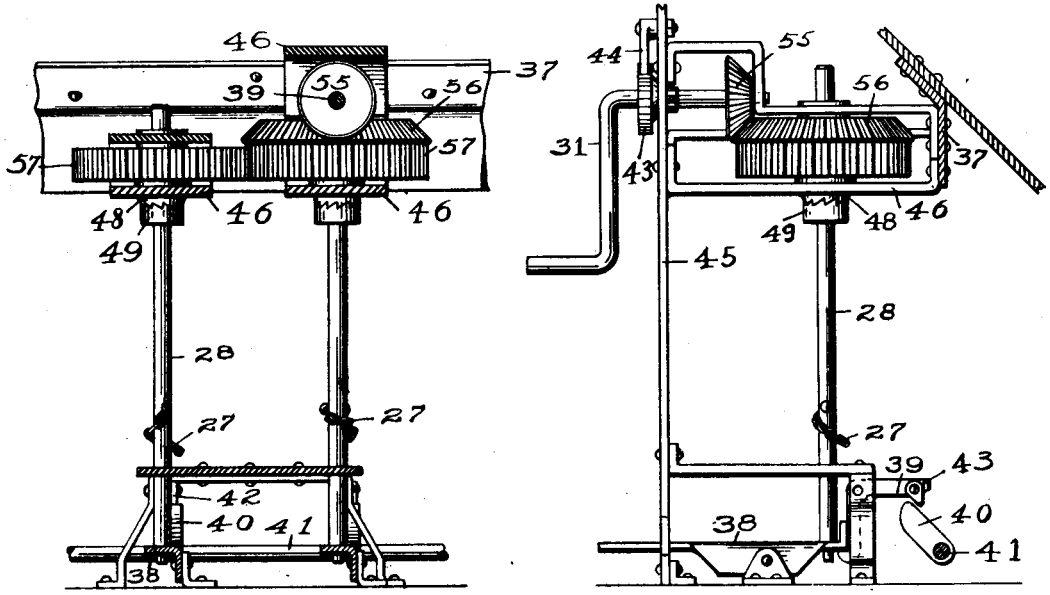

UNITED STATES PATENT OFFICE.

FRANK S. INGOLDSBY, OF ST. LOUIS, MISSOURI, ASSIGNOR TO THE INGOLDSBY AUTOMATIC CAR COMPANY, OF ST. LOUIS, MISSOURI, A CORPORATION OF WEST VIRGINIA.

DUMP-CAR.

1,028,882.  Specification of Letters Patent.  Patented June 11, 1912.

Application filed September 20, 1906, Serial No. 335,352. Renewed October 17, 1910. Serial No. 587,510.

*To all whom it may concern:*

Be it known that I, FRANK S. INGOLDSBY, a citizen of the United States, residing at St. Louis, State of Missouri, have invented a certain new and useful Improvement in Dump-Cars, of which the following is a full, clear, and exact description, reference being had to the accompanying drawings.

This invention relates to dump cars, the object being to provide a door raising mechanism in a form which shall be very efficient, while being light and simple in construction.

The invention is well adapted for dump cars of the Ingoldsby type, wherein there is a central longitudinal beam to which are hinged dumping doors which form a portion of the load carrying floor of the car and drop downward at their outer edges. With such cars the door raising mechanism extends along the central beam, and has heretofore involved a longitudinal rotating member, which being subjected to torsional strains had to be either very heavy or very stiff.

The present invention provides a door raising mechanism wherein the longitudinal members are subjected to tension only, thus allowing the use of much lighter members and saving in the dead weight of the car.

The invention includes, broadly, the door raising mechanism operated under the car by tension members, as well as the more particular embodiment of it herein shown.

The drawings show an Ingoldsby car having my door raising mechanism.

Figure 1:
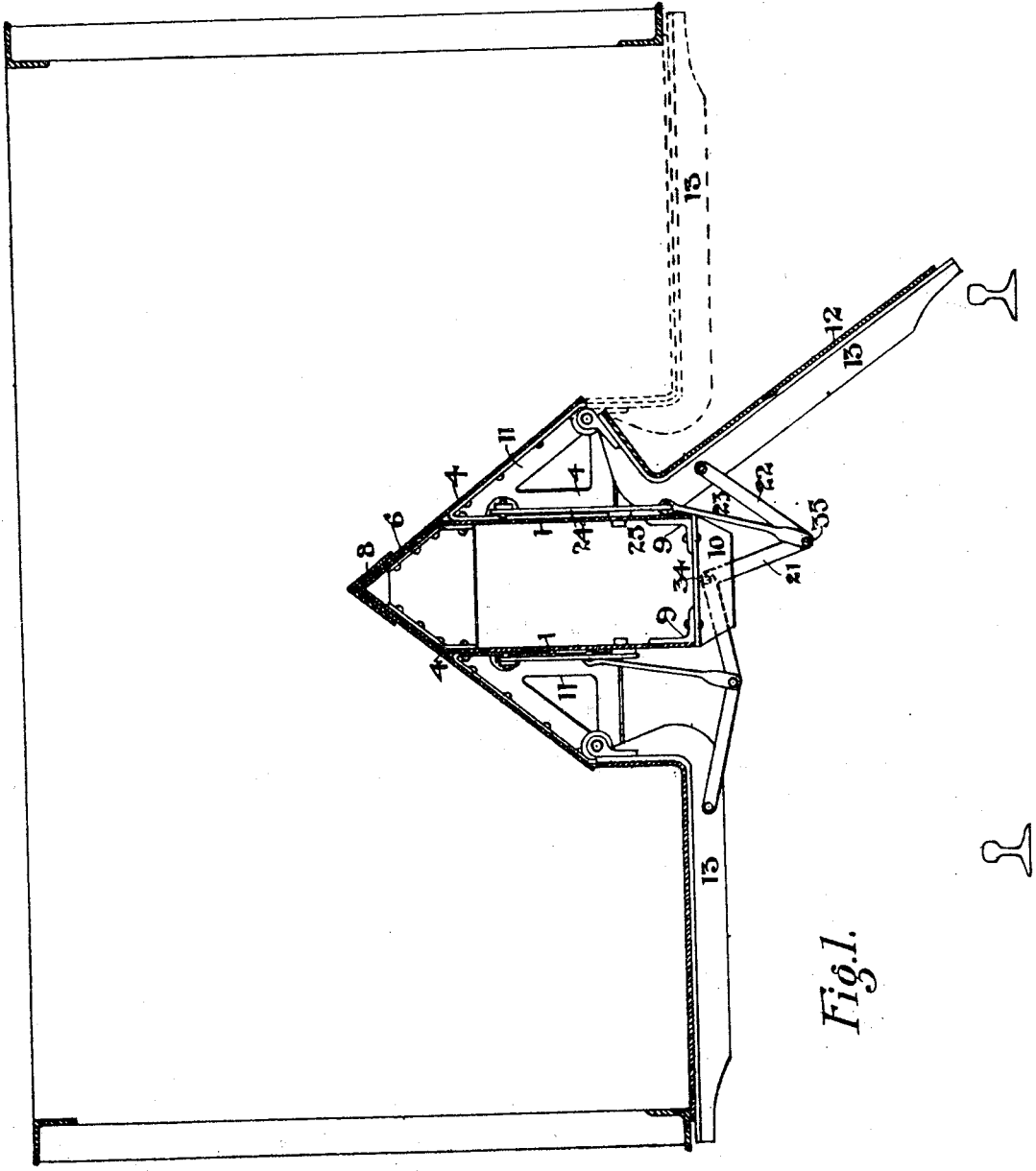
Figure 2:
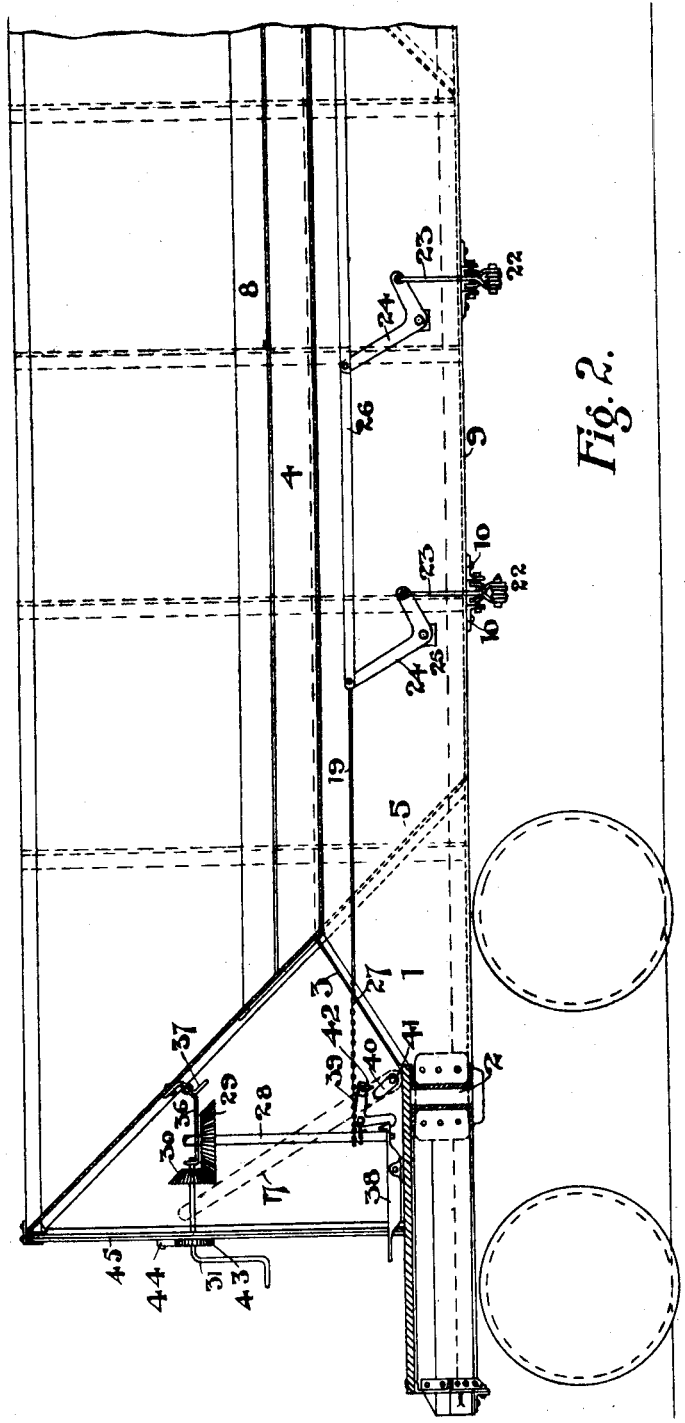
Figure 3:
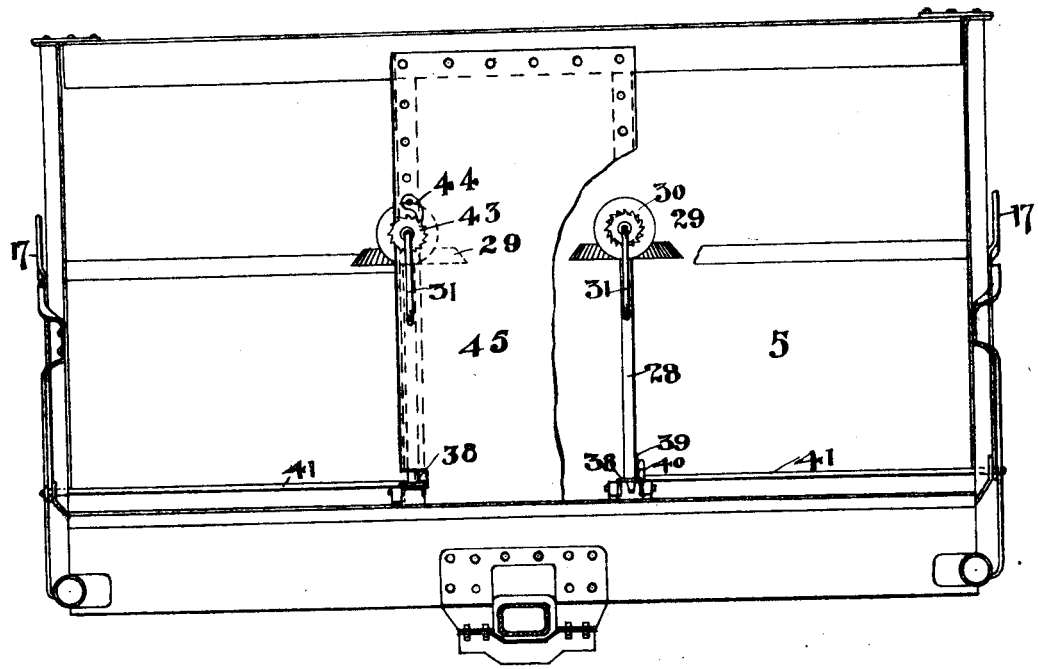
Figure 4:
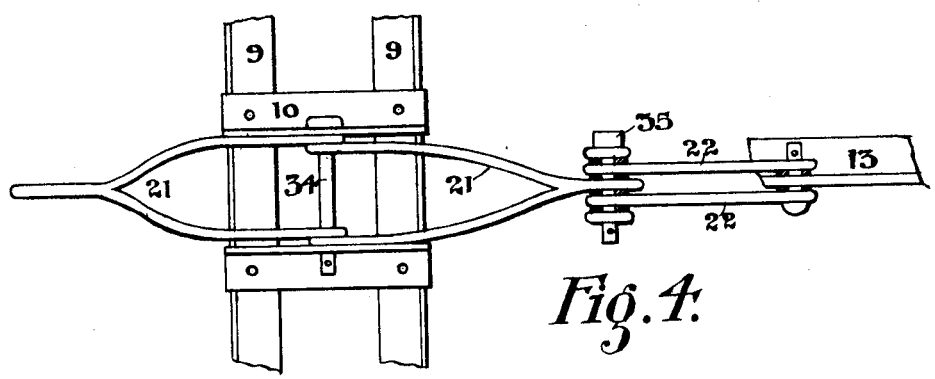
Figure 5:
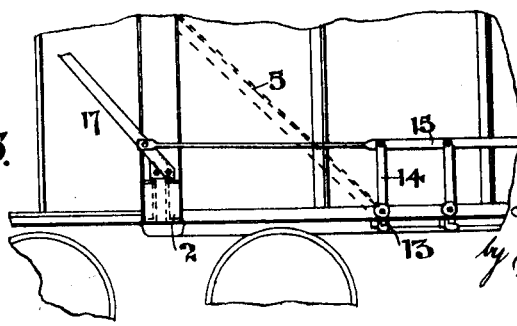

Figure 1 is a cross section. Fig. 2 is an elevation of the car sectioned through the longitudinal beam. Fig. 3 is an end view, showing duplicate winding cranks. Fig. 4 is a bottom plan of a portion of the car. Fig. 5 is a fragmentary side view. Fig. 6 is an end view showing a form of winding mechanism when a single crank is employed. Fig. 7 is a sectional end elevation parallel with Fig. 6. Fig. 8 is a longitudinal section near the end of the car. Fig. 9 is a plan of the winding gears shown in Figs. 7 and 8. Fig. 10 is a sectional end elevation showing another form of single crank mechanism. Fig. 11 is a longitudinal section near the end of the car showing such mechanism. Fig. 12 is a plan of the winding gears shown in Figs. 10 and 11. Fig. 13 is a perspective of the treadle holding pawl with its dog.

The central longitudinal beam may be of the box order type shown and claimed in my application No. 270,018, filed July 17th, 1905, and including a pair of parallel plates 1, which extend from the bolster 2 at one end of the car to the bolster at the other end. The upper edges of these plates are shown as cut off diagonally at 3, where they approach the bolster. The central beam has cover plates 4, extending from one inclined end floor 5 to the other, and secured to the upper bent portion 6 of the plates 1, which lie along the cover plates and are riveted to them intermediate of the end floors. Crowning the ridge thus formed, is an angle bar 8 extending from end floor to end floor.

The center sill plates 1 carry angles 9 along their lower edges. Cross bars 10 are riveted to these angles. Suitable cross braces 11 which may be plates or castings are placed in the V-shaped space between the outer side of the plates 1 and the under side of the cover plates 4, being riveted to these two plates. The dumping floors designated 12 are carried by floor beams 13, which are pivoted to the cross braces 11.

The floor beams are shown as bent intermediately, thus increasing the carrying capacity of the car, without raising its center of gravity. This feature is shown and claimed in my prior application No. 303,985, filed March 3rd, 1906. The outer ends of the dumping doors when elevated, are held in any suitable manner, as by hooks 14 engaging the projecting floor beams, these hooks being carried by the side of the car and being connected by a link 15 with the operating lever 17 shown in dotted lines in Fig. 2. This method of supporting the doors is the usual one in the Ingoldsby cars, being shown for example in my Patent No. 613,279, issued Nov. 1st, 1898.

I provide door raising mechanism beneath the central ridge, which is characterized by the employment of tension members, obviating the undue strength and stiffness required of torsion members. This door raising mechanism consists of toggle links 21 and 22 connected together and connected at their ends to the cross bars 10 of the box girder and to the floor beams 13 respectively. The knuckle of the toggle is connected by a link 23 with a bell crank 24, which is pivoted to plate 1 or to a block 25 carried on the outer side of the plate 1. The upper ends of the bell cranks are connected by a through bar 26 which is adapted to be drawn longitudinally to raise the doors.

As shown, the mechanism for pulling the bar 26 consists of a rod 19 and chain 27 secured to the bar and to a winding shaft 28, which may have its upper end connected with the operating crank 31. Thus when the crank is rotated, the chain is wound on the shaft 28 and the doors are raised.

The through bar 26, as well as the bell cranks and links 23 being subjected to tension only, may be very light in construction, and still possess sufficient strength. The links 21 and 22 are under compression, and I therefore make these links double, as shown in Fig. 4. The links 21 are preferably spread, where they engage the supporting pin 34 to make a firm support, this pin being carried by two adjacent cross bars 10. These links 21 preferably merge together at their outer ends at the knuckle of the toggle. The links 22 may be parallel and lie on opposite sides of the common end of the links 21 and the floor beam 13. The link 23 has its lower end formed like a clevis and passes onto the outer sides of the two links 22, all these links being held at the knuckle by a common pin 35.

The door raising mechanism, including the chains and shafts, is substantially duplicated on the two sides of the car. There may be two raising cranks 31, as shown in Fig. 3, or a single crank for the two shafts, as shown in Figs. 6 to 12. The supporting pin 34 for the links 21 may be common to the two raising mechanisms, being located in the central longitudinal plane of the car, as shown in Figs. 1 and 4.

The short arm of the bell crank 24 extends at such an angle that the links 23 are moved in a path which is not much out of a vertical plane. The ordinary looseness of connection at the upper and lower ends of the links allows sufficient play for this purpose.

It is desirable to release the raising mechanism automatically, whenever the doors are to be dropped, thus preventing the crank or cranks being thrown around violently. I accomplish this by carrying each shaft 28 shiftably so that it may drop and thus pass out of connection with the crank 31. The upper end of the shaft is loosely journaled, and the lower end is set into a foot lever 38 which is normally held in elevated position by a pawl 39. This pawl has an arm carrying a dog 42 in proximity to a short arm 40 carried on the rock shaft 41, to which the corresponding main operating lever 17 is secured.

When either operating lever is thrown forward to release the doors, the corresponding arm 40 moves the corresponding dog and through it the pawl 39 to release its lever 38. This allows the shaft 28 to drop by gravity sufficiently to become disconnected from the crank (as hereinafter explained) wherefore this shaft rotates idly as the doors drop. A toe on the inner end of the foot lever 38 prevents the pawl 39 from passing over the lever, and when it is desired to reconnect the raising mechanism, a foot pressure on the outer end of the lever raises the shaft 28, forcing the pawl rearward until it clicks under the end of the lever, holding the parts in engagement. The pivoted dog 42, abutting a shoulder 43 on its rear side but movable freely toward the end of the car, allows the arm 40 to pass freely to place.

When it is desired to have independent cranks for the two raising mechanisms, I employ the construction shown in Figs. 2 and 3. As there shown, each shaft 28 is loosely journaled at its upper end in the plate 36 carried by the cross beam 37 and the underside of the inclined floor 5. Just below the plate 36 each shaft carries a bevel gear 29 which may mesh with the bevel pinion 30 on the crank shaft 31. This shaft is journaled in the vertical plate 45, which plate carries a pawl 44 adapted to engage a ratchet wheel 43 on the crank shaft. When either lever 17 is thrown to release the doors, the corresponding shaft 28, dropping, breaks the engagement between the gear 29 and pinion 30.

When a single raising crank is desired for both sides of the car, I use either the mechanism shown in Figs. 6 to 9, or that shown in Figs. 10 to 12. In each case I have a box-like frame 46 between the vertical plate 45 and the cross beam 37. In this frame are loosely journaled the hubs of a pair of wheels 47 or 57. The shafts 28 loosely extend through these hubs. On the lower face of the hubs are formed teeth 48 which may engage with teeth on a collar 49 carried by the shaft. A dental clutch is thus provided, enabling the wheel to drive the shaft when the shaft is in operative position, but allowing disconnection between the shaft and wheel when the shaft drops. Owing to the clutches, the crank shaft 31 may be permanently geared with the wheels. Whenever either lever is thrown, the separation of the clutch 48, 49, (as illustrated in Fig. 6) allows the corresponding shaft 28 to rotate freely.

In the construction shown in Figs. 6 to 9, the wheels 47 are worm-wheels and the crank shaft carries a single worm 50 meshing with both wheels. This provides a simple mechanism and one which is self-locking, requiring no holding ratchet and pawl.

In the mechanism shown in Figs. 10 to 12, the wheels 57 are spur gears meshing with each other. Connected with, or formed on, one of these gears is the bevel gear 56, with which meshes the bevel pinion 55 on the crank shaft. This construction avoids the friction of worm-gearing but is not self locking, the usual ratchet and pawl 43, 44, being provided to secure the gain in winding.

Simplicity and positive action are important points in my door raising mechanism, as well as the fact that the members are under tension. I have shown the bell cranks as placed vertically, though if desired, they may be slanted to reduce the angular travel of the short end thereof, such slanting being easily accomplished by inclining the outer face of the blocks 25.

Having thus described my invention, I claim:

1. In a dump car, the combination of two dumping doors on opposite sides of the car axis, two longitudinally extending closing members on opposite sides of said axis, said members being adapted to be under tension during the closing operation and a combination of levers and links connecting said members with said doors.

2. The combination in a dump car of a plurality of longitudinal dumping doors, two longitudinal members forming a portion of the door closing mechanism and adapted to be under tension during the door closing movement, bell cranks operated by said members, respectively, and links connecting the bell cranks with the doors.

3. In a dump car, the combination of a dumping door and car frame, a jointed link connection between the two, a longitudinally movable operating member, and a bell crank connected with said operating member and said link connection.

4. In a dump car, the combination with a car frame of a longitudinal dumping door, a bell crank mounted to swing in a fore and aft direction, a longitudinally movable member connected with the bell crank, toggle links connecting the door with the frame, and a connection between such links and the bell crank.

5. In a dump car, the combination of a central longitudinal beam, a pair of dumping doors hinged to the opposite edges thereof, a pair of door raising mechanisms carried by the beam and each comprising a longitudinal member, a bell crank and links operated thereby.

6. In a dump car, the combination of a central longitudinal beam having a ridge, a pair of dumping doors hinged thereto, a pair of door raising mechanisms under the ridge and having separate longitudinal members subjected to tension during the raising of the doors.

7. A central longitudinal beam having a pair of vertical longitudinal plates surmounted by a ridge, and door raising mechanism carried by said plates and consisting of levers and links, the levers being pivotally mounted on the plates.

8. The combination with a pair of bolsters, of a central longitudinal beam having a pair of vertical plates extending from bolster to bolster and surmounted by a ridge, a door raising mechanism carried by said plates on their outer sides beneath the ridge and subject to tension during the raising operation, and means at the end of the car for operating such mechanism.

9. In a dump car, a door raising mechanism comprising toggle links on the under side of the door, bell cranks connected therewith, and a member connecting the bell cranks.

10. In a dump car, door raising mechanism comprising toggles on the hinged side of the door, bell cranks, links connecting the bell cranks with the toggle knuckles, and a bar connecting the other ends of the bell cranks.

11. On a dump car, the combination with a suitable support of a pivoted dumping door, raising mechanism therefor on the hinged side of the door, a longitudinal tension member connected with the raising mechanism, a winding shaft, and flexible members connecting the same with the longitudinal tension member.

12. In a dump car, the combination of a suitable support, a pivoted dumping door, a toggle connected at one end with the support and at the other with the door, a bell crank, a connection between the bell crank and the toggle, and means for moving the bell crank.

13. In a dump car, the combination of a suitable support, a pivoted dumping door, toggle links connected at their ends to the support and door; a bell crank, a link connecting one arm thereof with the toggle, a longitudinal tension member connected with the other end of the bell crank, and means for drawing on such tension member.

14. The combination of a beam, a dumping door pivoted thereto, a toggle, one link of which is connected with the beam and the other with the door, a bell crank pivotally carried by said beam, means connecting one arm of the bell crank with the toggle, and operating means extending lengthwise of the beam and connected with the other arm of the bell crank.

15. The combination of a beam, a dumping door pivoted thereto, a toggle, one link of which is connected with the beam and the other with the door, a bar extending lengthwise of the beam, and means for moving said bar lengthwise, and mechanism connecting the bar with the toggle.

16. In a dump car, the combination of a beam, dumping doors hinged to opposite edges thereof, toggle links hinged together and having their inner ends connected to the beam and their outer ends to the door, bell cranks carried by said beam, means connecting corresponding arms of the bell cranks with the toggles, and a common operating bar connecting other arms of the bell cranks.

17. In a dump car, the combination of a central longitudinal beam, dumping doors hinged to opposite edges thereof, toggle links hinged together and having their inner ends connected to the beam and their outer ends to the door, bell cranks carried by said beam, bars connecting corresponding arms of the bell cranks with the toggles, a common operating bar connecting other arms of the bell cranks, a winding shaft, and a chain connecting said shaft and operating bar.

18. In a dump car, the combination of a box girder beam having a pair of parallel vertical plates, bell cranks pivotally carried on the outer sides of said plates, operating means connecting the bell cranks, dumping doors, and mechanism for closing the same connected with the bell cranks.

19. In a dump car, the combination of a box girder beam having a pair of parallel vertical plates, bell cranks pivotally carried on the outer sides of said plates, operating bars connecting the upper ends of the bell cranks, dumping doors, toggle links for closing the same, and connections between the toggles and the other arms of the bell cranks.

20. In a dump car, the combination of a ridge, a pair of vertical longitudinal plates beneath the ridge and connected with it, mechanism carried on the outer sides of said plates, longitudinal bars in the space between the outer sides of the plates and the under side of the ridge, each bar being connected with the mechanism on that side of the plate, dumping doors pivoted adjacent to the lower edge of the ridge, and means connecting the dumping doors with said mechanism.

21. In a dump car, the combination of a ridge, vertical plates beneath the same connected with it, flanged reinforcing members along the lower edges of the vertical plates, cross bars connecting said reinforcing members, floor beams hinged adjacent to the lower edge of the ridge, raising toggles comprising pivoted links, the inner end of which is carried by a pin mounted in said cross bars, and the outer end of which is pivoted to said floor beam, and mechanism for drawing the knuckle of the toggle upward.

22. In a dump car, the combination of a ridge, a pair of vertical longitudinal plates beneath the ridge and connected with it, bell cranks carried on the outer sides of said plates, longitudinal bars in the space between the outer sides of the plates and the under side of the ridge, each bar being connected with bell cranks on that side of the plate, dumping doors pivoted adjacent to the lower edge of the ridge, toggle links mounted at their inner ends on cross bars between the vertical plates and at their outer ends pivoted to the floor beams, and connecting members between the bell cranks and toggles.

23. In a dump car, the combination of a ridge, vertical plates beneath the same connected with it, cross bars connected with the vertical plates, hinged floor beams, raising toggles comprising pivoted links, the inner end of which is carried by a pin mounted in said cross bars, and the outer end of which is pivoted to said floor beam, bell cranks carried by said vertical plates on their outer sides, members connecting the bell cranks with the toggles, and means for moving the upper ends of the bell cranks.

24. The combination with toggle links and bell cranks for operating them, of a driving crank, a winding shaft geared thereto, means including a chain connecting the winding shaft with the bell cranks, and means for releasing the connection between the crank and winding shaft.

25. In a dump car, the combination with the dumping door, of a door raising mechanism whose main longitudinal member is subjected to tension only, a driving crank, a winding shaft geared thereto, means including a chain connecting the winding shaft with said main longitudinal member, means for releasing the doors, and means for automatically releasing the engagement between the crank and shaft when the doors are released.

26. In a dump car, the combination of a crank shaft, a winding shaft, disengageable mechanism connecting the same, a foot lever for supporting the winding shaft, a pawl for holding the foot lever in position, dumping doors, and raising means therefor connected with the winding shaft.

27. In a dump car, the combination of driving mechanism, a winding shaft geared therewith, a foot lever for supporting the winding shaft, a pawl for holding the foot lever in position, dumping doors, raising means therefor connected with the winding shaft, means for releasing the doors, and means automatically operated by the releasing means for releasing the pawl to allow the separation of the gearing.

28. In a dump car, the combination of a crank shaft, a pair of winding shafts, gearing connecting the crank shaft with each winding shaft, dumping doors, and independent raising mechanisms therefor connected by chains with the winding shafts.

29. The combination, in a dump car, of a driving gear, a pair of wheels both connected therewith, a pair of raising mechanisms, and a pair of clutches between the raising mechanisms and said wheels, said raising mechanism including shafts, longitudinally shiftable to disengage the clutches.

30. The combination, in a dump car, of a driving gear, a wheel meshing therewith, a raising mechanism including a longitudinally shiftable shaft, and a clutch between it and the wheel controlled by shifting the shaft.

31. In a dump car, the combination of a pair of connected wheels, a driving crank adapted to rotate both wheels, a pair of door operating mechanisms driven thereby, and disengageable means for connecting said mechanisms with said wheels, respectively, said means being separable by gravity, and mechanism for returning the portion of said means so moved.

32. The combination, in a dump car, of a pair of door raising mechanisms, a pair of winding shafts for operating the same respectively, gearing adapted to connect said shafts, clutches between the gearing and shafts, and driving mechanism connected with said gearing and means whereby the longitudinal movement of the shafts uncouples the clutches.

33. In a dump car, the combination of a dumping door, the bell crank and links for raising the same, a member movable longitudinally for operating the bell crank and independent means for supporting the door when closed.

34. In a dump car, the combination, of door closing mechanism, self-locking operating mechanism, and a clutch between said mechanisms enabling the operating mechanism to engage and operate the raising mechanism in the closing direction at a number of points.

35. The combination, in a dump car, of a driving worm, a worm wheel meshing therewith, a driven raising mechanism, and a clutch between it and the worm wheel allowing continuous rotation of the worm wheel.

36. The combination, in a dump car, of a driving worm, a pair of worm wheels meshing therewith, a pair of raising mechanisms, and a pair of clutches between the raising mechanisms and worm wheels.

37. The combination with a dumping door, of a rotatable winding shaft connected therewith, a wheel within which said shaft is slidably journaled, a clutch between the shaft and wheel, and means for movably supporting the shaft.

38. The combination with dumping doors, of a pair of rotatable winding shafts connected therewith, connected wheels within which said shafts are slidably journaled, clutches between the shafts and wheels respectively, independent means for movably supporting the shafts, and a common operating mechanism for the two wheels.

39. In a dump car, the combination of a pair of door closing shafts, common means for rotating them, independent means for enabling displacing movement of these two shafts, and disengageable connections between the shafts and said common means, which connections are controlled by said independent means.

40. In a dump car, the combination of a dumping door, a door raising mechanism having a member extending lengthwise of the car and under tension when raising the door and connected with the door by a series of members pivoted together, and means independent of said mechanism for supporting the door when closed.

41. In a dump car, the combination of a central longitudinal beam, longitudinal dumping doors carried thereby, bell cranks carried by said beam, links connecting said bell cranks with the door independently of any other door, and mechanism for operating said bell cranks.

42. In a dump car, the combination of a plurality of longitudinal dumping doors, a pair of longitudinally movable door raising members, a pair of bell cranks one on each side of the car axis operated by said members, links adapted to shove on the under sides of the doors to close them, and mechanism connecting said links with the bell cranks.

43. In a dump car, the combination of raising mechanism, a winding shaft therefor, a foot lever for supporting said shaft, and a catch for holding the foot lever in active position.

44. In a dump car, the combination of a dumping door, a winding shaft, raising mechanism connecting the shaft and door, mechanism for driving said shaft, a foot lever for supporting said shaft in engagement with its driving mechanism, a catch for holding the foot lever, mechanism for releasing the door, and mechanism automatically operated thereby for moving said catch to release the foot lever.

45. In a dump car, the combination of door closing mechanism, self-locking operating mechanism, a clutch between said mechanisms, and a lever for controlling the clutch.

46. The combination, in a dump car, of a driving worm, a worm wheel meshing therewith, a driven raising mechanism, a clutch between it and the worm wheel, and a lever for controlling the clutch.

47. In a dump car, the combination with door closing mechanism of self-locking operating mechanism therefor, and a lever for controlling the connection between the door closing mechanism and the operating mechanism.

48. The combination of a door, closing mechanism therefor, and self-locking operating mechanism for the closing mechanism, and mechanism for connecting and disconnecting the two independently of the position of the operating mechanism.

49. In a dump car, the combination of a pair of door closing shafts, common means for rotating them, a foot lever for enabling displacing movement of these two shafts, and disengageable connections between the shafts and said common means, which connections are controlled by said foot lever.

In testimony whereof, I hereunto affix my signature in the presence of two witnesses.

FRANK S. INGOLDSBY.

Witnesses:
CHAS. H. MEYER,
MARY D. WHITCOMB.